United States Patent
Burkholder et al.

(10) Patent No.: US 9,998,637 B2
(45) Date of Patent: Jun. 12, 2018

(54) AERIAL IMAGING SYSTEM FOR SMALL HIGH WINGED AIRCRAFT

(71) Applicants: William Russel Burkholder, St Petersburg, FL (US); Daniel Frazier Carlson, St Petersburg, FL (US)

(72) Inventors: William Russel Burkholder, St Petersburg, FL (US); Daniel Frazier Carlson, St Petersburg, FL (US)

(73) Assignee: Scientific Aerial Services, Saint Petersburg, FL (US)

( * ) Notice: Subject to any disclaimer, the term of this patent is extended or adjusted under 35 U.S.C. 154(b) by 370 days.

(21) Appl. No.: 14/971,868

(22) Filed: Dec. 16, 2015

(65) Prior Publication Data
US 2016/0182774 A1   Jun. 23, 2016

Related U.S. Application Data

(60) Provisional application No. 62/092,923, filed on Dec. 17, 2014.

(51) Int. Cl.
| | |
|---|---|
| *H04N 5/225* | (2006.01) |
| *G03B 15/00* | (2006.01) |
| *F16M 13/02* | (2006.01) |
| *F16B 47/00* | (2006.01) |
| *B64D 47/08* | (2006.01) |
| *G03B 17/56* | (2006.01) |

(52) U.S. Cl.
CPC ........... *H04N 5/2252* (2013.01); *B64D 47/08* (2013.01); *F16B 47/00* (2013.01); *F16M 13/022* (2013.01); *G03B 15/006* (2013.01); *G03B 17/56* (2013.01); *G03B 17/561* (2013.01)

(58) Field of Classification Search
None
See application file for complete search history.

(56) References Cited

U.S. PATENT DOCUMENTS

| | | | | |
|---|---|---|---|---|
| 3,833,196 | A * | 9/1974 | Protzman | F16M 11/10 248/208 |
| 4,669,843 | A * | 6/1987 | Bozzolato | G01C 11/02 396/12 |
| 4,825,232 | A * | 4/1989 | Howdle | B64D 47/08 396/12 |
| 4,863,130 | A * | 9/1989 | Marks, Jr. | B60R 1/00 248/205.3 |
| 5,231,435 | A * | 7/1993 | Blakely | G03B 15/006 396/12 |
| 5,246,193 | A * | 9/1993 | Faidley | B60R 11/04 224/401 |
| 5,904,330 | A * | 5/1999 | Manico | A01K 39/00 119/51.01 |
| 9,817,298 | B1 * | 11/2017 | Dhall | G03B 17/02 |
| 2005/0265711 | A1 * | 12/2005 | Heibel | B60R 11/04 396/419 |
| 2012/0251092 | A1 * | 10/2012 | Zwaan | B64C 39/024 396/428 |

(Continued)

Primary Examiner — W B Perkey
(74) Attorney, Agent, or Firm — Sandra L Layer (57) ABSTRACT

An imaging system container designed for fast, secure, temporary attachment on the door of a small high-winged aircraft for aerial imaging having a housing, a flange for mounting and an imaging port for use with a digital single lens reflex camera, video camera or other imaging device.

15 Claims, 9 Drawing Sheets

(56) References Cited

U.S. PATENT DOCUMENTS

2013/0223833 A1\* 8/2013 Tenenbaum ........... G03B 17/02
396/419
2016/0182774 A1\* 6/2016 Burkholder .......... H04N 5/2252
348/144

\* cited by examiner

AERIAL IMAGING SYSTEM FOR SMALL HIGH WINGED AIRCRAFT

RELATED APPLICATION

The present patent application claims priority to the corresponding provisional patent application Ser. No. 62/092,923, entitled "IMAGING SYSTEM CONTAINER DESIGNED FOR FAST, SECURE, TEMPORARY ATTACHMENT ON THE DOOR OF SMALL, HIGH-WINGED AIRCRAFT FOR AERIAL IMAGING" filed on Dec. 17, 2014.

BACKGROUND OF THE INVENTION

Field of the Invention

The present invention relates to an Aerial Imaging System for Small High Winged Aircraft and more particularly pertains to an imaging system designed for fast, secure, temporary attachment on the door of a small high-winged aircraft, without modification to the airframe, for the purpose of aerial imaging.

Description of the Prior Art

The use of aerial imaging systems is known in the prior art. More specifically, aerial imaging systems previously devised and utilized for the purpose of obtaining aerial images while in flight are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,825,232 to Howdle discloses an Apparatus for Mounting Aerial Survey Camera Under Aircraft Wing. U.S. Pat. No. RE44,984 to Wawro discloses an Aerial Photography Mount. U.S. Pat. No. 3,917,199 discloses a Detachable pod for aerial Photography. An Aerial Camera Housing for High Wing Aircraft is disclosed in U.S. Pat. No. 3,689,012 to Liston. Lastly, U.S. Pat. No. 6,542,181 to Houska and Wallace discloses a High performance aerial video camera system.

While these devices fulfill their respective, particular objectives and requirements, the aforementioned patents do not describe an aerial imaging system for small high-winged aircraft that allows for fast, secure, temporary attachment of an imaging system on the door of a small high-winged aircraft for aerial imaging that does not include complicated mounting hardware or modification to the structure of the aircraft.

In this respect, the aerial imaging system for small high-winged aircraft according to the present invention substantially departs from the conventional concepts and designs of the prior art, and in doing so provides an apparatus primarily developed for the purpose of for fast, secure, economical, and temporary attachment on the door of a small high-winged aircraft for aerial imaging without the use of tools or structural modification of the aircraft.

Therefore, it can be appreciated that there exists a continuing need for a new and improved aerial imaging system for small high-winged aircraft which can be used for fast, secure, economical, temporary attachment on the door of a small high-winged aircraft for aerial imaging. In this regard, the present invention substantially fulfills this need.

SUMMARY OF THE INVENTION

In view of the foregoing disadvantages inherent in the known types of aerial imaging systems now present in the prior art, the present invention provides an improved aerial imaging system for small high-winged aircraft. As such, the general purpose of the present invention, which will be described subsequently in greater detail, is to provide a new and improved aerial imaging system for small high-winged aircraft which has all the advantages of the prior art and none of the disadvantages.

To attain this, the present invention essentially comprises a housing formed in a semi-cylindrical configuration having an open top and a closed bottom with an interior cavity between the open top and closed bottom. The housing has an interior surface and an exterior surface. The open top has a front edge and a rear edge. The housing includes a rear wall. The bottom is formed with a centrally located port configured for imaging and at least one small aperture for use with a separate viewing device or sensor. The imaging port is located centrally in the bottom of the housing.

A flange composed of a thin, but strong, sheet material is formed integrally with the back wall of the housing. The flange attaches the housing quickly and securely to the aircraft door, and it has three sections: a front section, an intermediate section and a tail section. The front section is formed integrally with the back of the housing with an extension that projects away from the back and from the top rear edge of the housing, thereby forming a first ledge of sufficient width to allow for vertical installation of the system on the exterior of the aircraft door. The intermediate section has a vertical component that allows for closure of an aircraft window and a horizontal component having a width slightly larger than the depth of a window sill on an exterior door panel of an aircraft having a fixed high wing. The horizontal component is adapted to rest on the top of the window sill on the door panel. The tail section is formed of an elongated vertical section parallel to the rear wall of the housing and adapted to slide along an interior edge of the door panel of an aircraft having a fixed high wing. The length of the tail section is such that it does not interfere with the door handle on the interior of an aircraft having a fixed high wing.

One or more suction cups are located adjacent to the bottom on the exterior surface of the rear wall and couple the housing to the exterior surface of the door panel of the aircraft.

An imaging device mount is located interior of the housing above the imaging port.

A lid covers the open top.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved aerial imaging system for small high-winged aircraft which has all of the advantages of the prior art aerial imaging systems and none of the disadvantages.

It is another object of the present invention to provide a new and improved aerial imaging system for small high-winged aircraft which may be easily and efficiently manufactured and marketed.

It is further object of the present invention to provide a new and improved aerial imaging system for small high-winged aircraft which is of durable and reliable constructions.

An even further object of the present invention is to provide a new and improved aerial imaging system for small high-winged aircraft which is susceptible of a low cost of manufacture with regard to both materials and labor, and which accordingly is then susceptible of low prices of sale to the consuming public, thereby making such aerial imaging system for small high-winged aircraft economically available to the buying public.

Even still another object of the present invention is to provide an aerial imaging system for small high-winged aircraft for fast, secure, temporary attachment on the door of a small high-winged aircraft for aerial imaging.

A still further object of the present invention is to provide an aerial imaging system for small high-winged aircraft that does not require tools to install.

An additional object of the present invention is to provide an aerial imaging system for small high-winged aircraft that protected from turbulent airflow and vibrations.

Another object of the present invention is to provide an aerial imaging system for small high-winged aircraft which provides access to the imaging device and facilitates the installation of sensors and imaging device controls.

Lastly, it is an object of the present invention to provide a new and improved aerial Imaging system for easy attachment to common high-winged aircraft and requiring no structural modification to the aircraft.

A feature of the present invention includes a latch to secure the lid to the open top of the housing.

An additional feature of the invention includes two parallel rails that secure a transparent cover over the imaging port. The transparent imaging port cover protects imaging devices, including lenses and other sensors, from dirt and dust during takeoff and landing. The imaging port cover rails provide for easy replacement in the event the cover is scratched or otherwise damaged.

Still another feature of the invention are optional small holes located in the bottom of the housing for additional viewing devices to allow an aircraft pilot to see view a wider area in order to control the imaging device.

Another feature of the current invention are optional small holes in the back of the housing through which cables can be fed to control the imaging device or secondary viewing device allowing the housing to be used with both wireless and wired device controls.

In one preferred embodiment of the invention having a basic imaging device mount, a foam cradle is formed above the imaging port having a hole for receiving the lens of the imaging device, the foam cradle securing the device and absorbing vibration resulting from operation of the aircraft.

In an alternate preferred embodiment of the present invention having a stabilizing imaging device mount, a gimbal is used to provide both vertical and horizontal stabilization to the imaging device.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
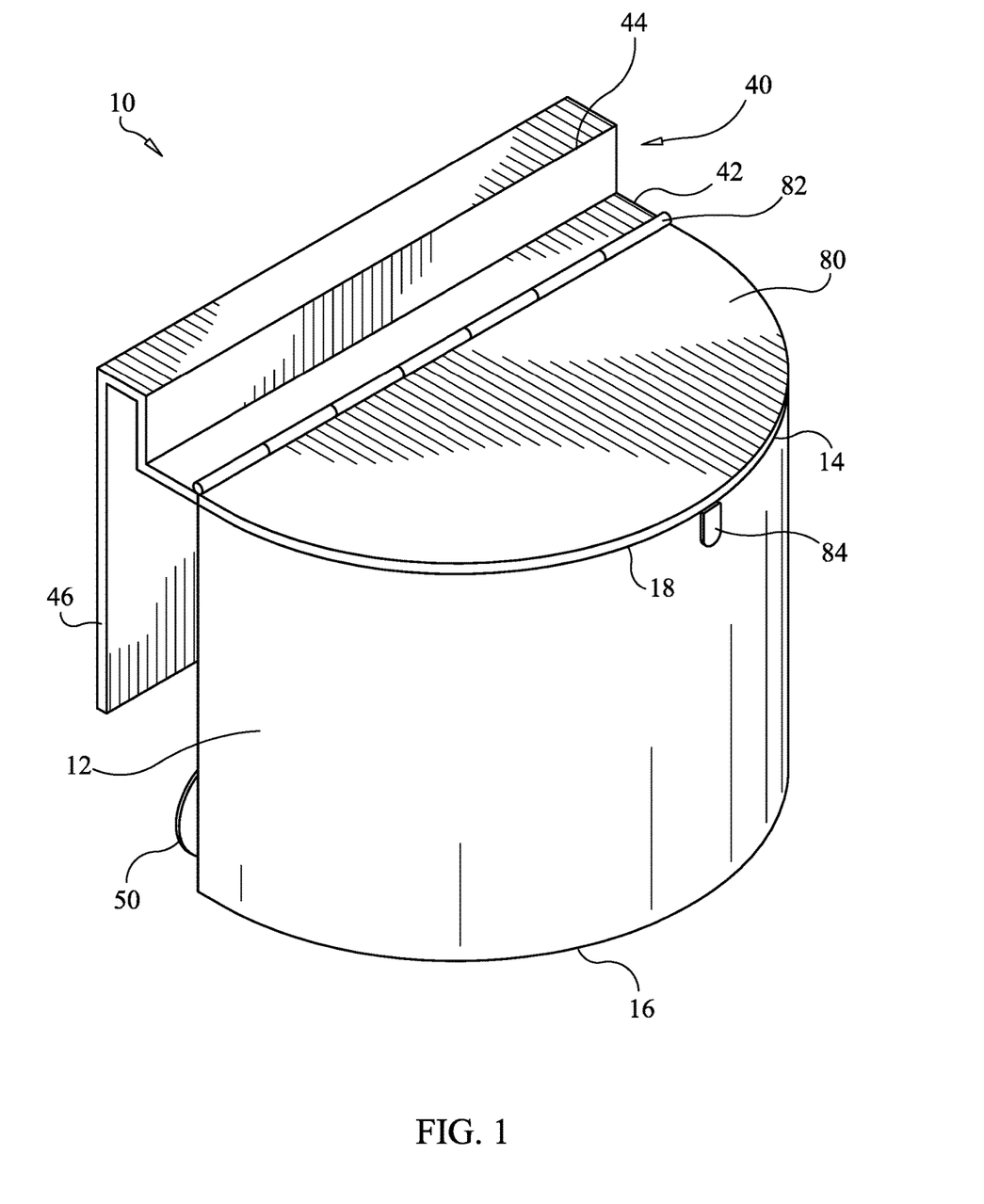
FIG. 1 is a perspective view of an aerial imaging system for small high winged aircraft constructed in accordance with the principles of the present invention.

With reference now to the drawings, and in particular to FIG. 1 thereof, the preferred embodiment of the new and improved aerial imaging system for small high-winged aircraft embodying the principles and concepts of the present invention and generally designated by the reference numeral 10 will be described.

The present invention, the aerial imaging system for small high-winged aircraft 10 is comprised of a plurality of components. Such components in their broadest context include a housing having an imaging port, a mount for an imaging device in the interior of the housing, a flange for attaching to an aircraft door, and a lid. Such components are individually configured and correlated with respect to each other so as to attain the desired objective.

In the broadest sense the system is comprised of a housing formed in a semi-cylindrical configuration having an open top and a closed bottom with an interior cavity between the open top and closed bottom. The housing has an interior surface and an exterior surface. The open top has a front edge and a rear edge. The housing includes a rear wall. The bottom is formed with a centrally located port configured for imaging and at least one aperture for use with a separate viewing device or sensor. The imaging port is located centrally in the bottom of the housing and has a generally rectangular configuration.

A flange is formed integrally with the rear wall of the housing having a front section, an intermediate section, and a tail section. The front section extends rearward from the rear wall adjacent to the rear edge of the open top forming a first ledge of sufficient width to allow for vertical installation of the system on the exterior of the aircraft door. The intermediate section having a vertical component which allows for closure of the aircraft window and a second horizontal ledge having a width slightly larger than the width of a window sill of an exterior door panel of an aircraft having a fixed high wing. The second ledge adapted to rest on the top of the window sill on the door panel. The tail section is formed of an elongated vertical section parallel to the rear wall of the housing and adapted to slide along an interior edge of the door panel of an aircraft having a fixed high wing. At least one suction cup is located adjacent to the bottom on the exterior surface of the rear wall and couple the housing to the exterior surface of the door panel of the aircraft. An imaging device mount is located interior to the housing. A lid covers the open top.

Figure 5:
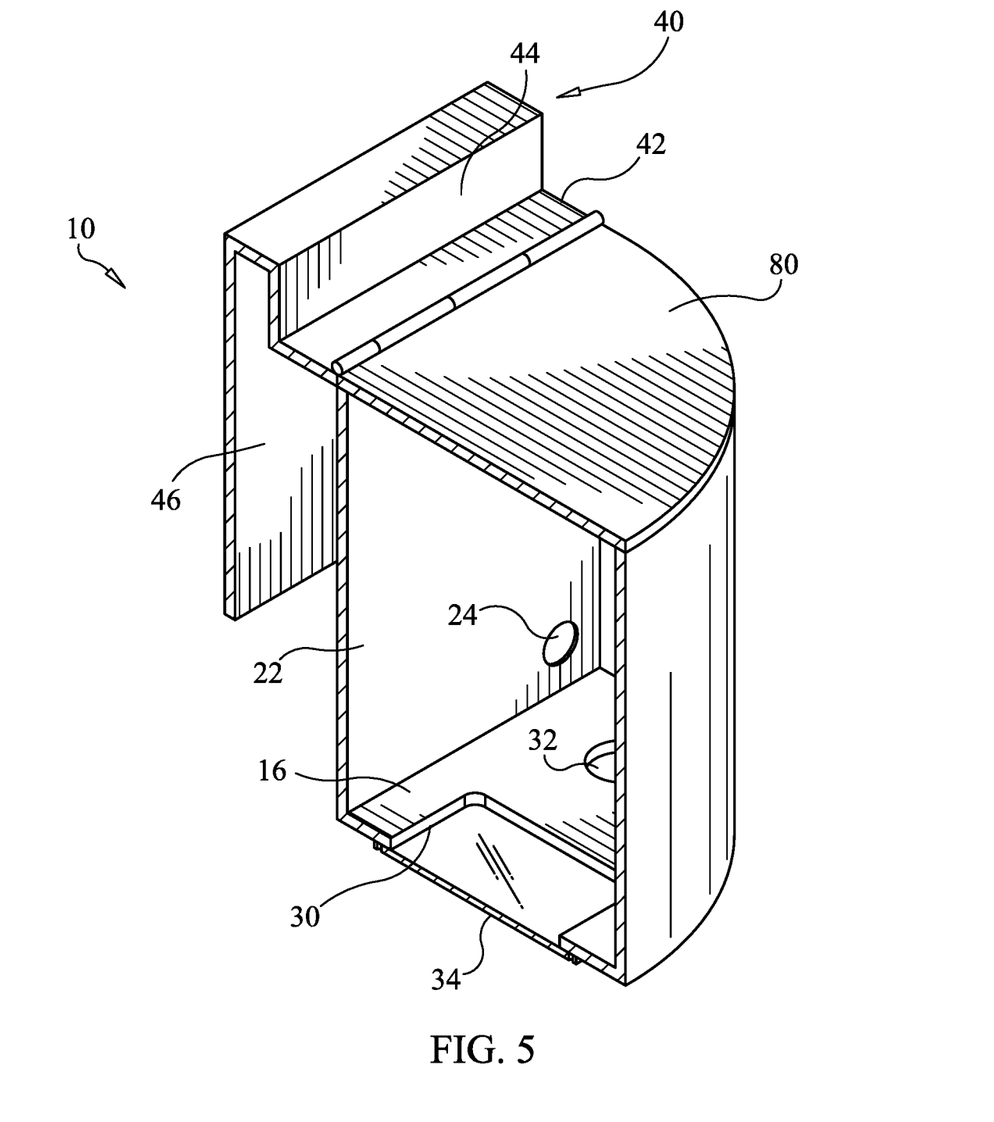
FIG. 5 is a cross-sectional view of an aerial imaging system.
Figure 6:
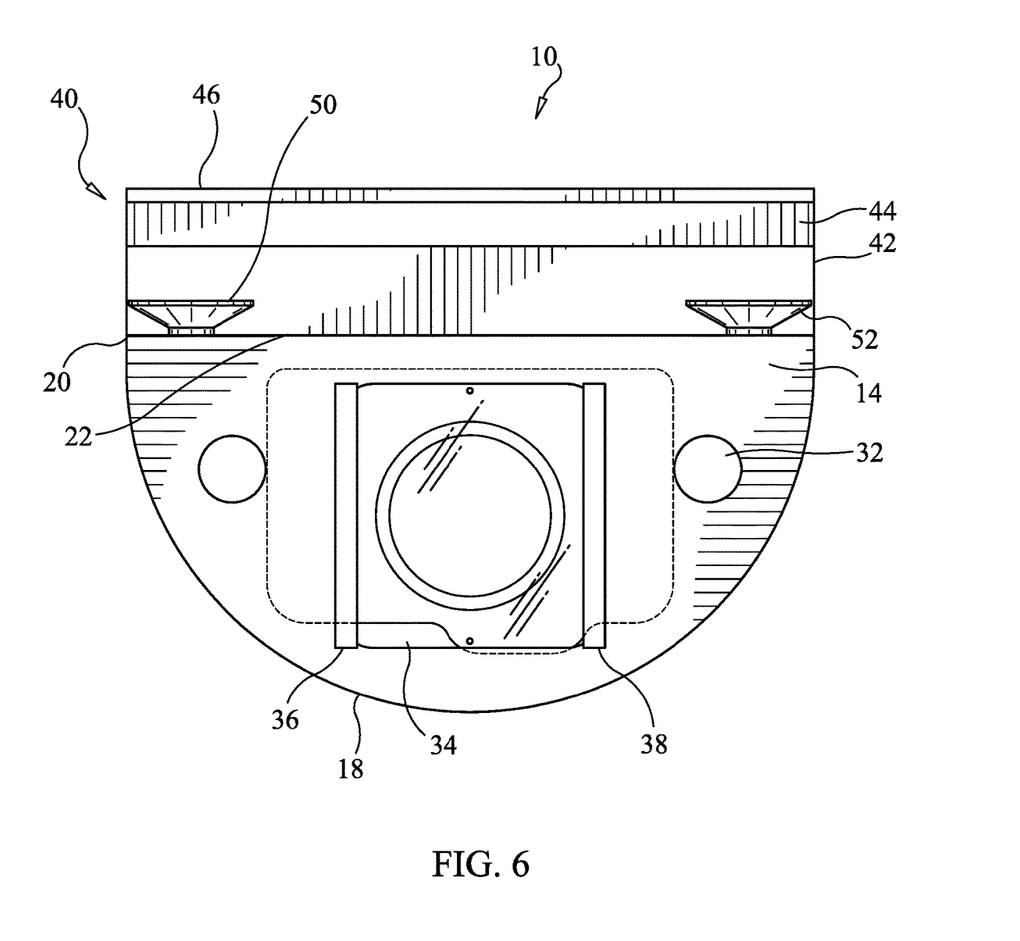
FIG. 6 is a bottom view of an aerial imaging system.
Figure 7:
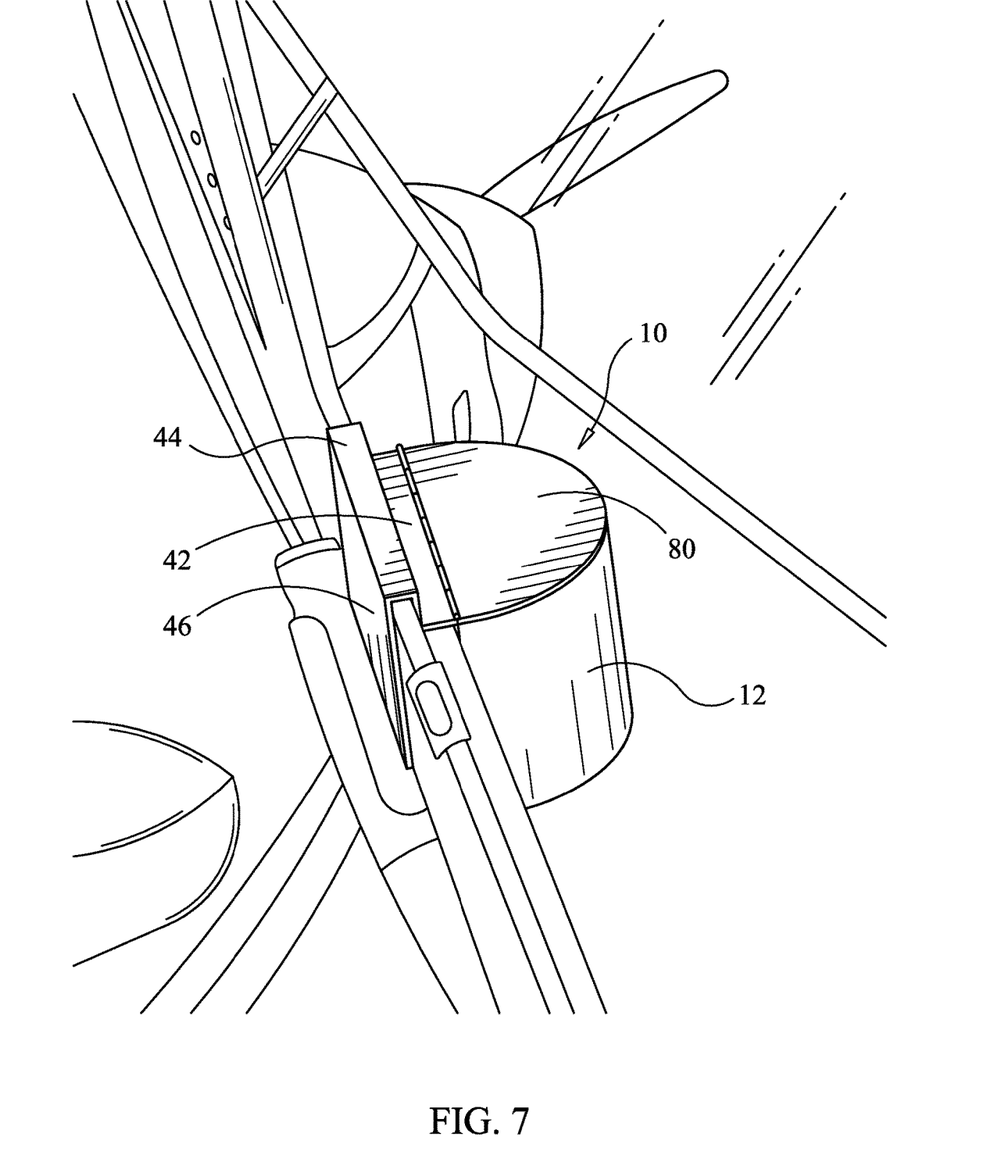
FIG. 7 is a perspective view of an aerial imaging system installed on a high winged aircraft door prior to flight.
Figure 8:
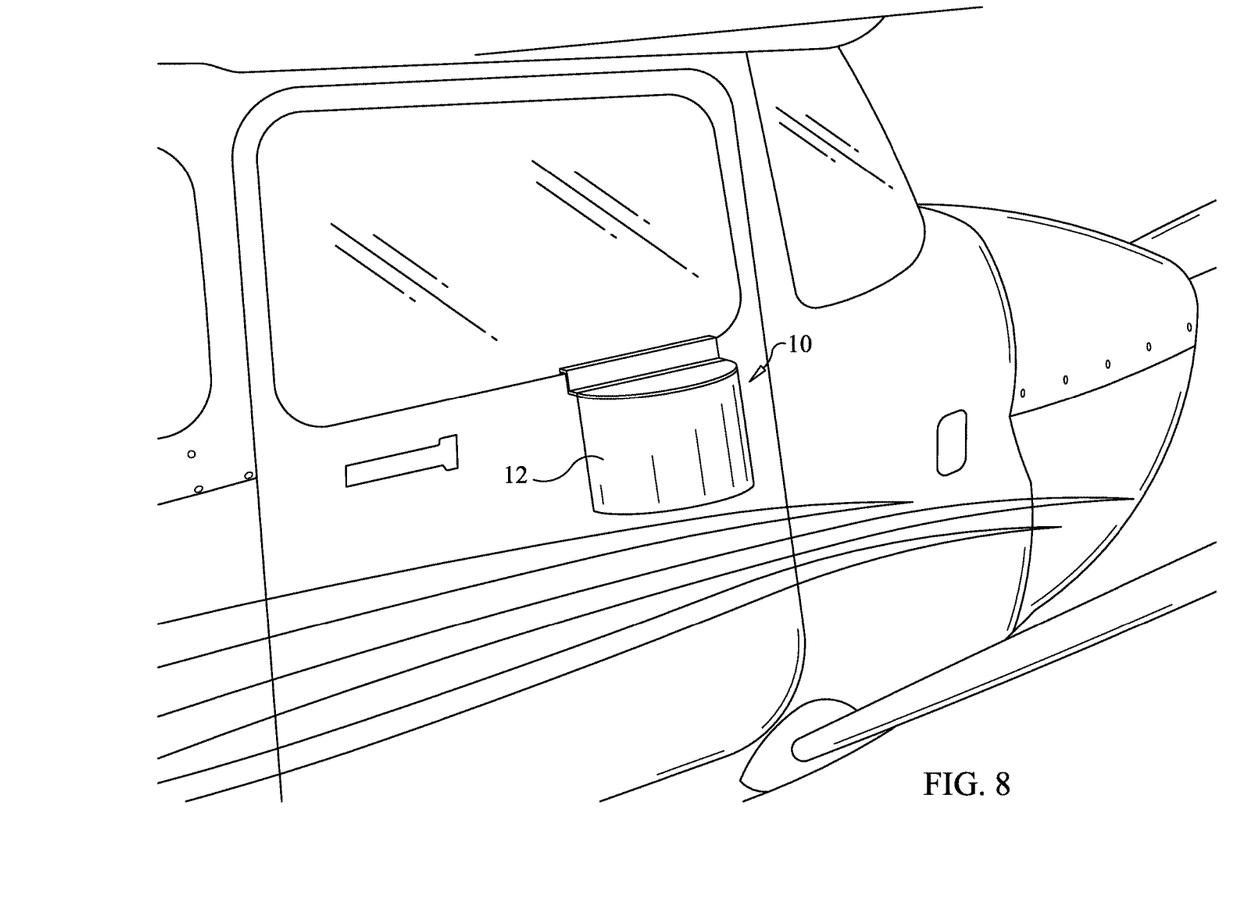
FIG. 8 is a perspective view of an aerial imaging system installed on a high winged aircraft door during flight.

In the preferred embodiment of the AERIAL IMAGING SYSTEM FOR SMALL HIGH WINGED AIRCRAFT, as referenced by numeral 10 and shown in FIGS. 1, 2 and 4-9, first provided is a housing 12 formed in a semi-cylindrical configuration, having an open top 14 and a closed bottom 16 with an interior cavity between the open top and closed bottom. The housing has an interior surface and an exterior surface. The open top has a front edge 18 and a rear edge 20. The housing has a rear wall 22. A small aperture 24 for use with a control cable is shown in FIG. 5. The bottom is formed with a centrally located port 30 configured for imaging and at least one aperture 32. The imaging port is located centrally in the bottom of the housing and has a generally rectangular configuration. A transparent port cover 34 formed from optical quality glass covers the port. Dual rails 36, 38 are located on either side of the port on the exterior surface of the bottom of the housing and removably attach the transparent cover to the bottom of the housing. The removable port cover also provides rapid access to the imaging devices while the aerial imaging system is attached to the aircraft door;

A flange 40 is formed integrally with the rear wall of the housing having a front section 42 an intermediate section 44 and a tail section 46. The front section extends rearward from the rear wall adjacent to the rear edge of the open top forming a first ledge of sufficient width to allow for vertical installation of the system on the exterior of the aircraft door forming a first ledge. The intermediate section has a vertical component and a second horizontal ledge. The second ledge is of a width slightly larger than the depth the window sill of an exterior door panel of an aircraft having a fixed high wing and is adapted to rest on the top of the window sill on the door panel. The tail being is formed of an elongated vertical section parallel to the rear wall of the housing and adapted to slide along an interior edge of the door panel of an aircraft having a fixed high wing.

Dual suction cups 50, 52 are located adjacent to the bottom on the exterior surface of the rear wall and couple the housing to the exterior surface of the door panel of the aircraft.

Figure 2:
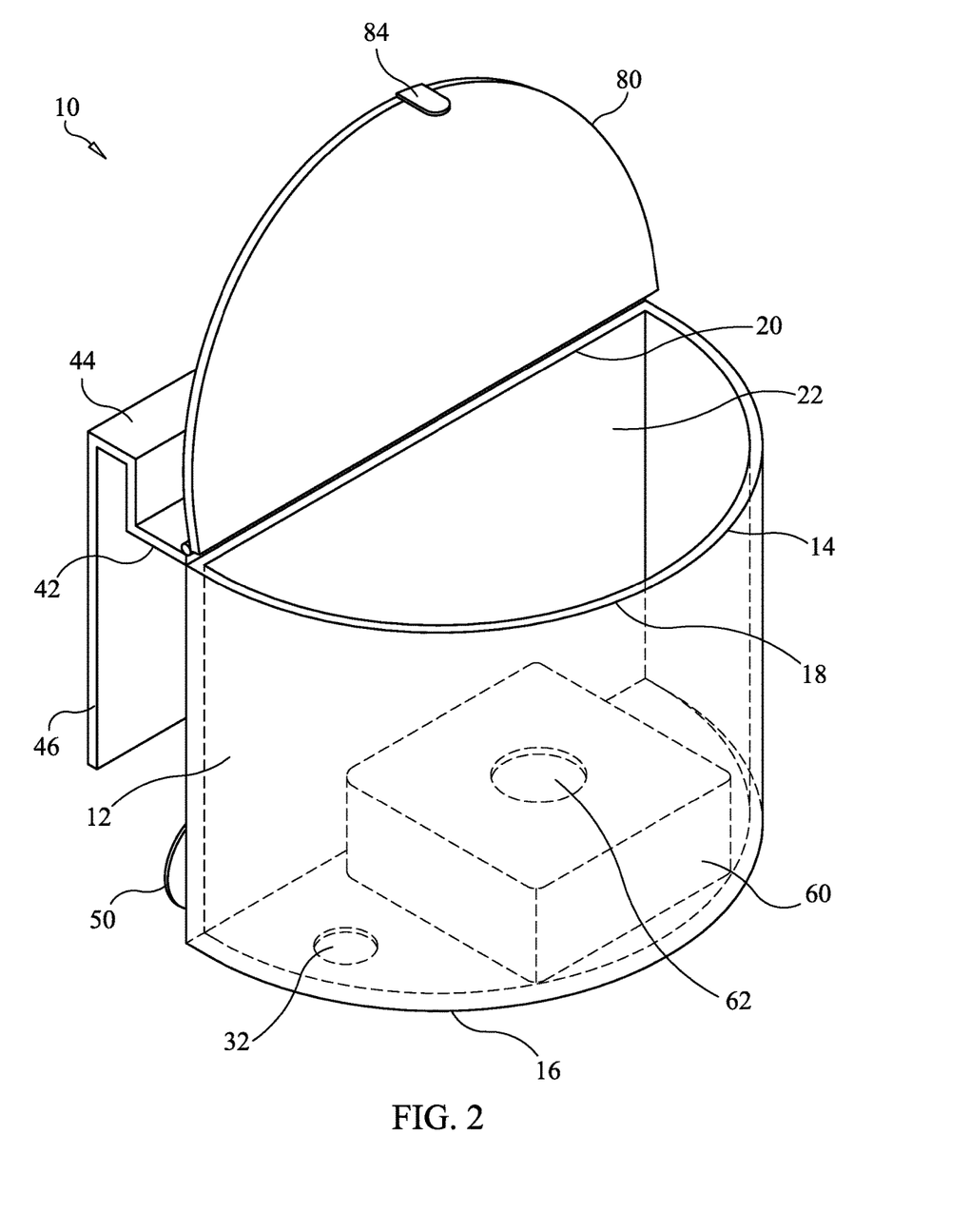
FIG. 2 is partially transparent view of an aerial imaging system for small winged aircraft having a basic imaging device mount.
Figure 9:
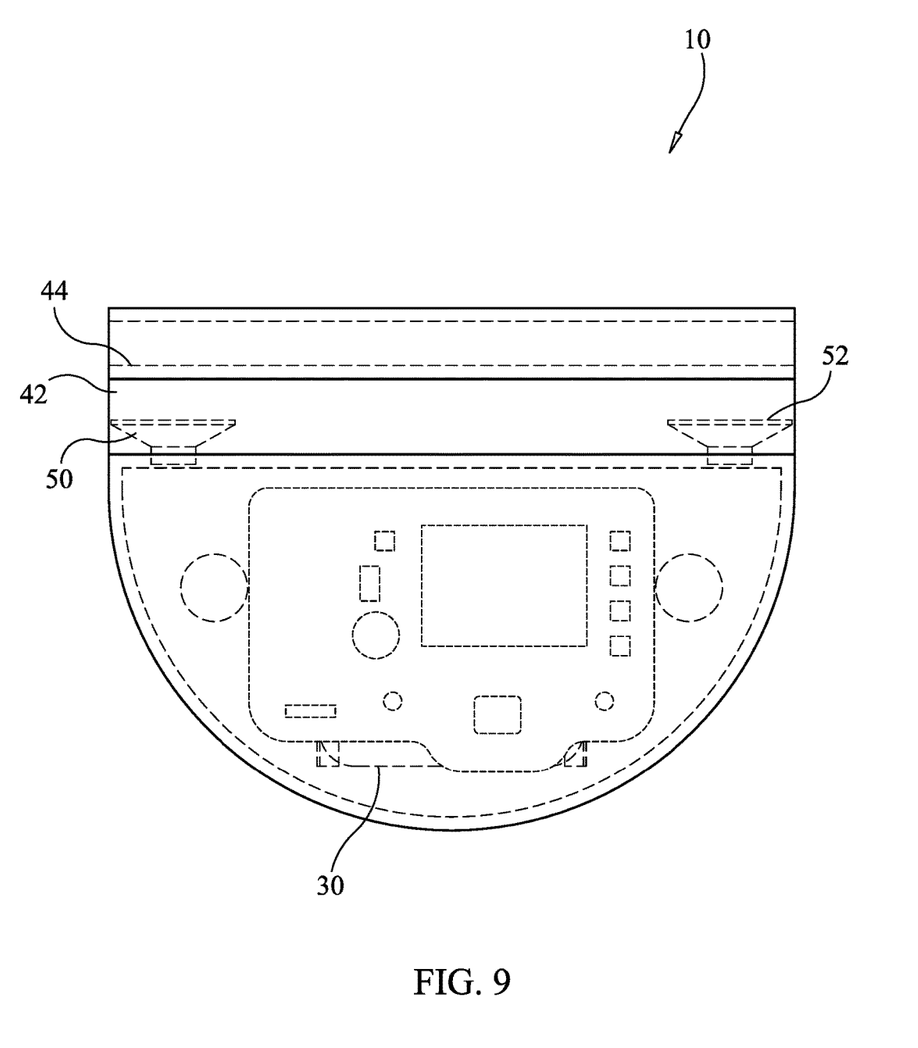
FIG. 9 is a top view of the interior of the housing showing the basic imaging device mount.

An imaging device mount 60 is formed adjacent to and above the imaging port and is further defined as having a top surface parallel to the bottom of the housing and sides perpendicular to the top surface and between the top surface and the bottom of the housing. The top surface is formed with an aperture 62. The aperture 62 has a diameter slightly larger than the lens of an imaging device and is adapted to receive the lens of an imaging device. The mount is formed of vibration absorbing foam.

A lid 80 is formed to cover the open top. A hinge is formed adjacent to the rear wall coupling the lid to the rear edge of the open top. A latch is included to secure the lid to the front edge of the open top of the housing.

Figure 3:
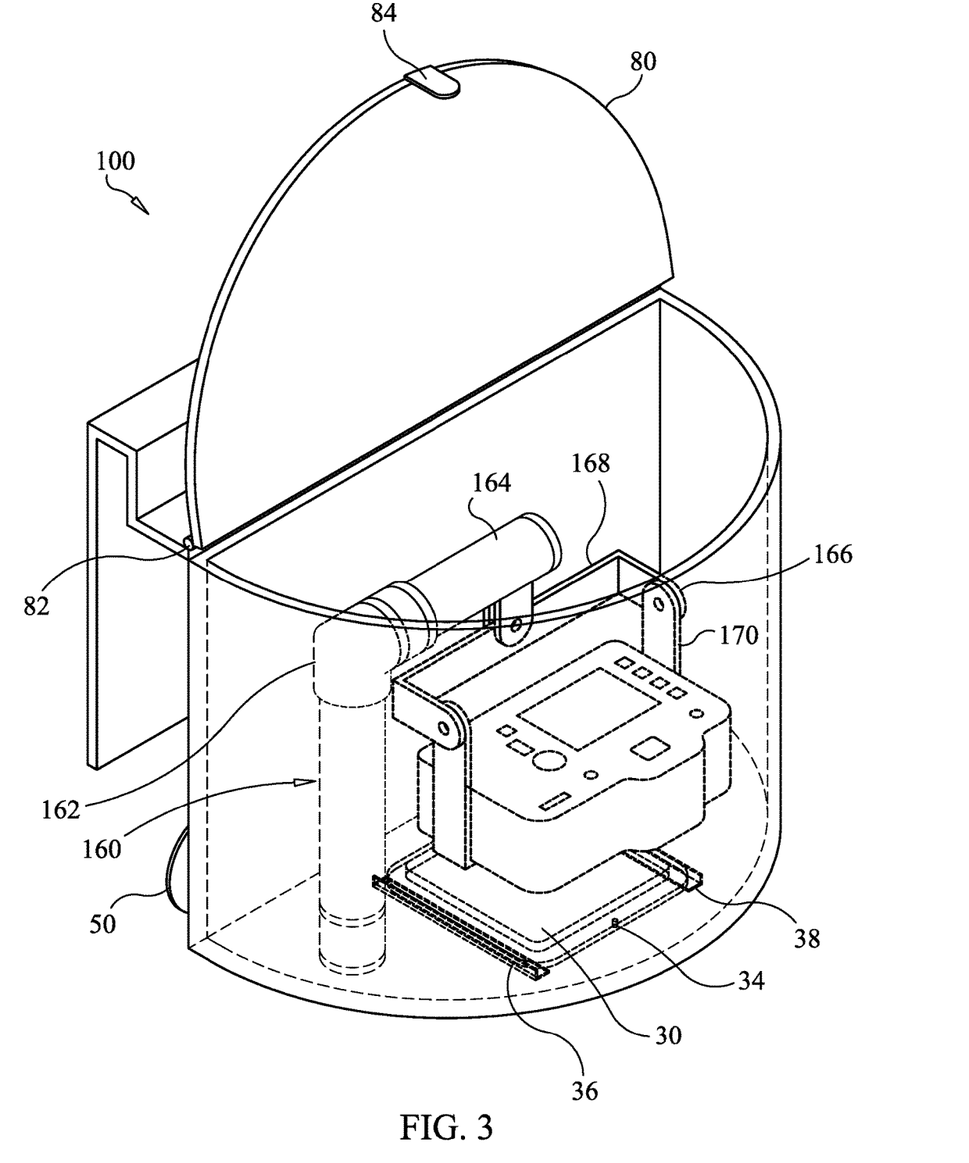
FIG. 3 is a partially transparent view of an alternate embodiment of an aerial imaging system having a stabilizing imaging device mount.
Figure 4:
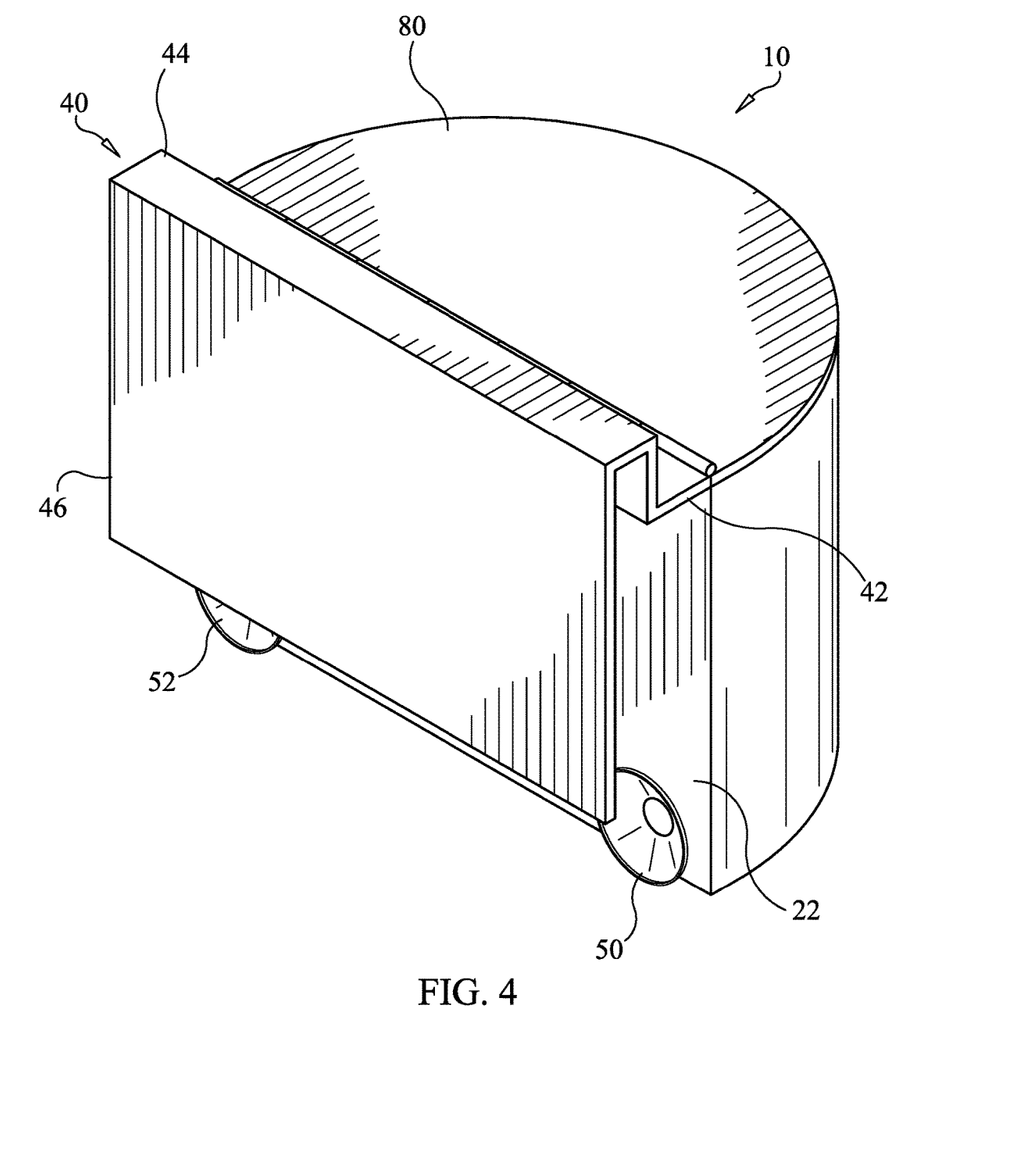
FIG. 4 is a rear perspective view.

The invention also includes an alternate preferred embodiment of the invention as shown in FIG. 3 and reference by numeral 100 featuring a stabilizing imaging device mount. The alternate embodiment includes a device mount 160 having a base 162 mounted to the interior surface of the housing and at least one arm 164. The arm is located above the imaging port. A two-axis gimbal 166 is attached to the lower surface of the arm having an upper section and a lower section 168. The upper section allows movement in a vertical plane and the lower section 170 allows movement in the horizontal plane. The lower section includes a plate for mounting an imaging device. Imaging devices are secured to the mounting plate using common fasteners such as bolts and clamps.

The present invention is a container built to house imaging devices and to be quickly and securely attached to the door of a high-winged aircraft without modification to the aircraft and without the use of tools. The container is attached by opening the passenger window and slipping the flange onto the door over the window sill with the flange inside the door and the housing held securely to the outside of the aircraft door. The flange is built of thin, strong material thereby permitting secure attachment and allowing the window and door release mechanisms to operate normally and unimpeded. The primary imaging device is placed in the housing with the lens facing downwards through the large imaging port and protected by a piece of optical quality glass. A second small hole on the bottom plate allows a small video camera to show a larger area to the user in real-time. Universal serial bus (USB) and high-definition multimedia interface (HDMI) cables attached to the imaging device and the video camera can connect to the user's laptop computer using a wireless interface or by threading cables through additional holes in the rear plate of the housing and inside the aircraft cabin. The digital single lens reflex (DSLR) camera or other primary imaging device may be held in place in the housing by a foam cradle that secures the imaging device and absorbs vibration or with the use of a stabilizing multi-axis gimbal. The lid fits over the open top the housing and protects the contents.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Further, although particular features of the present invention may be described with reference to one or more particular embodiments or figures, it should be understood that such features are not limited to usage in the one or more particular embodiments or figures with reference to which they are described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An aerial imaging system for high wing aircraft adapted for rapidly and removably coupling to an aircraft for the purpose of aerial imaging without structural changes to the aircraft, the system comprising, in combination:

A housing formed in a semi-cylindrical configuration, having an open top and a closed bottom with an interior cavity between the open top and closed bottom, the housing having an interior surface and an exterior surface, the open top having a front edge and a rear edge, the housing having a rear wall, the closed bottom formed with a centrally located port configured for imaging and at least one aperture, the port located centrally in the closed bottom of the housing, the port having a rectangular configuration;

a flange formed integrally with the rear wall adjacent to the rear edge of the open top of the housing having a front section, an intermediate section and a tail section, the front section extending rearward from the rear wall adjacent to the rear edge of the open top forming a first ledge, the intermediate section adapted to fit over the top of a window sill on an exterior door panel of an aircraft having a fixed high wing, the intermediate section of a thickness to allow for closure of the window, the tail being formed of an elongated vertical section parallel to the rear wall of the housing and adapted to slide along an interior edge of the door panel of the aircraft; and at least one suction cup adjacent to the closed bottom on the exterior surface of the rear wall couple the housing to the exterior surface of the door panel of the aircraft;

an imaging device mount interior of the housing; and a lid formed to cover the open top.

2. The aerial imaging system of claim 1 wherein the port is further defined as having a clear cover, the cover formed from a transparent material taken from a class of transparent materials including glass and plastic.

3. The aerial imaging system of claim 2 wherein dual rails are located on either side of the port on the exterior surface of the bottom of the housing, the rails positioned parallel to the sides of the cover and configured to removably attach the cover to the bottom of the housing by sliding the cover between the rails.

4. The aerial imaging system of claim 1 wherein the intermediate section of the flange is further defined as having a vertical component and a horizontal component, the horizontal component having a width, the width being slightly larger than the depth of a window sill on an exterior door panel of an aircraft having a fixed high wing, the horizontal component having an upper surface and a lower surface, the lower surface adapted to rest on the top of the window sill.

5. The aerial imaging system of claim 1 wherein the imaging device mount is formed adjacent to and above the imaging port inside the housing and is further defined as having a top surface parallel to the closed bottom of the housing and sides perpendicular to the top surface and between the top surface and the closed bottom of the housing, the top surface formed with an aperture, the aperture formed to receive the lens of a camera, the mount formed of a stabilizing foam.

6. The aerial imaging system of claim 1 wherein the imaging device mount is formed with a base mounted to the interior surface of the housing and at least one arm, the arm located above the imaging port, a gimbal attached to the lower surface of the arm having an upper section and a lower section, the upper section allowing movement in a vertical plane and the lower section allowing movement in the horizontal plane, the lower section providing a platform for mounting an aerial imaging device.

7. The aerial imaging system of claim 1 further comprising a hinge formed adjacent to the rear wall coupling the lid to the rear edge of the open top.

8. The aerial imaging system of claim 1 wherein the lid is further defined as having a latch configured to secure the lid to the housing.

9. The aerial imaging system of claim 1 wherein the closed bottom is formed with one or more small apertures located on either side of the imaging port.

10. The aerial imaging system of claim 1 wherein the rear wall is formed with one or more apertures.

11. An aerial imaging system for high wing aircraft adapted for removably coupling to an aircraft for aerial imaging. The system comprising, in combination:

A housing formed in a semi-cylindrical configuration, having an open top and a closed bottom with an interior cavity between the open top and closed bottom, the housing having an interior surface and an exterior surface, the open top having a front edge and a rear edge, the housing having a rear wall, the closed bottom formed with a centrally located port configured for imaging and at least one aperture, the port located centrally in the closed bottom of the housing, the port having a rectangular configuration, the port having a cover, the cover formed from a transparent material taken from a class of transparent materials including glass and plastic, dual rails located on either side of the port on the exterior surface of the closed bottom of the housing removably attach the cover to the closed bottom of the housing;

a flange formed integrally with the rear wall adjacent to the rear edge of the open top of the housing having a front section an intermediate section and a tail section, the front section extending horizontally from the rear wall forming a first ledge, the intermediate section having a vertical component and a second horizontal ledge, the second ledge being of a width slightly larger than the width of a top of a window sill on an exterior door panel of an aircraft having a fixed high wing, the second ledge having an upper surface and a lower surface, the lower surface adapted to rest on the top of the door panel, the tail being formed of an elongated vertical section parallel to the rear wall of the housing and adapted to slide along an interior edge of the door panel of an aircraft having a fixed high wing, dual suction cups adjacent to the closed bottom on the exterior surface of the rear wall of the housing couple the housing to the exterior surface of the door panel of the aircraft;

an imaging device mount interior of the housing; and a lid, formed to cover the open top.

12. The aerial imaging system of claim 11 wherein the imaging device mount is formed adjacent to and above the imaging port and is further defined as having a top surface parallel to the closed bottom of the housing and sides perpendicular to the top surface and between the top surface and the closed bottom of the housing, the top surface formed with an aperture, the aperture formed to receive the lens of a camera, the mount formed of a stabilizing foam.

13. The aerial imaging system of claim 11 wherein the imaging device mount is further defined as having a base mounted to the interior surface of the housing and at least one arm, the arm located above the imaging port, a gimbal attached to the lower surface of the arm having an upper section and a lower section, the upper section allowing movement in a vertical plane and the lower section allowing movement in the horizontal plane, the lower section providing a platform for mounting an aerial imaging device.

14. The aerial imaging system of claim 11 wherein a hinge is formed adjacent to the rear edge of the open top coupling the lid to the rear edge of the open top.

15. The aerial imaging system of claim 11 wherein the lid is further defined as having a latch configured to secure the lid to the housing.

* * * * *